Figure 1:
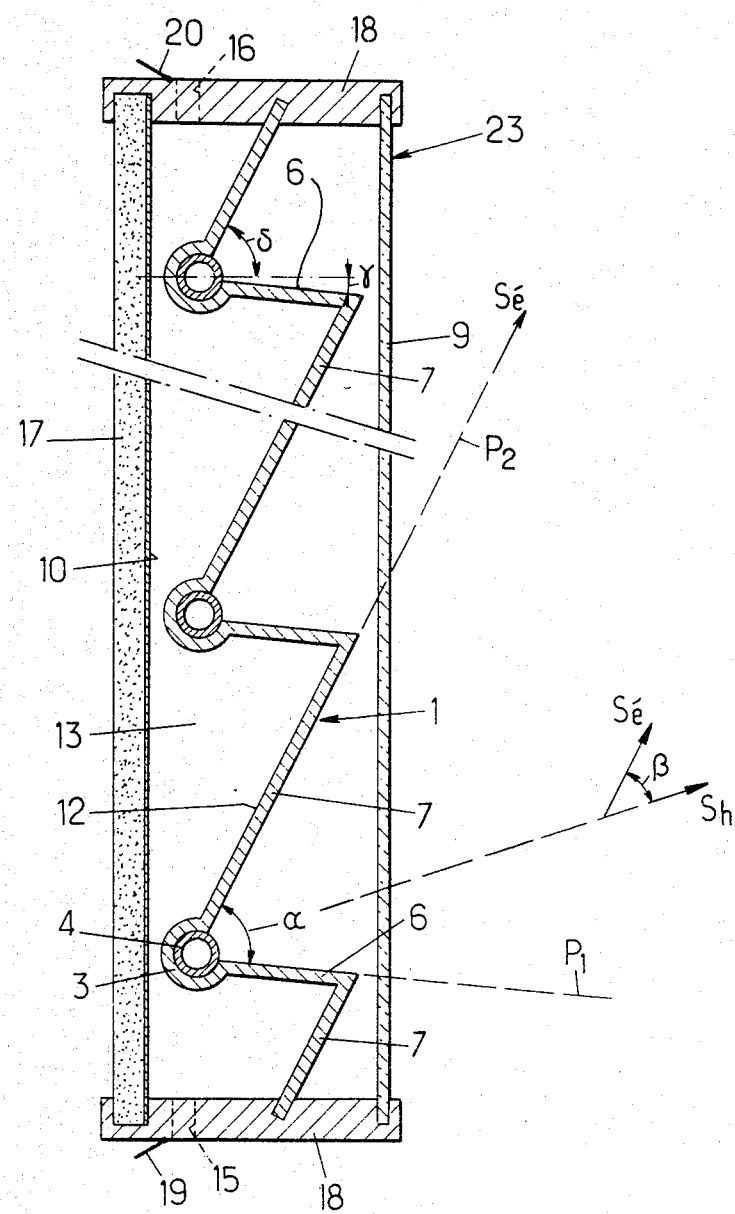

United States Patent [19]

Ladriere

[11] Patent Number: 4,534,336

[45] Date of Patent: Aug. 13, 1985

[54] SOLAR COLLECTORS

[76] Inventor: Serje Ladriere, Avenue du Cap Roux, Eze-sur-Mer, France

[21] Appl. No.: 626,853

[22] PCT Filed: Oct. 25, 1983

[86] PCT No.: PCT/FR83/00215

§ 371 Date: Jun. 22, 1984

§ 102(e) Date: Jun. 22, 1984

[87] PCT Pub. No.: WO84/01815

PCT Pub. Date: May 10, 1984

[30] Foreign Application Priority Data

Oct. 25, 1982 [FR] France ............................... 82 17805

[51] Int. Cl.³ ................................................ F24J 3/02
[52] U.S. Cl. ................................... 126/431; 126/428; 126/446; 126/448
[58] Field of Search ............... 126/428, 429, 431, 446, 126/448, 449

[56] References Cited

U.S. PATENT DOCUMENTS

| | | | |
|---|---|---|---|
| 4,014,313 | 3/1977 | Pedersen | 126/446 |
| 4,114,598 | 9/1978 | Van Leeuwen | 126/446 |
| 4,271,819 | 6/1981 | Farrell | 126/431 |
| 4,296,741 | 10/1981 | Harder | 126/429 X |
| 4,337,754 | 7/1982 | Conger | 126/431 X |

FOREIGN PATENT DOCUMENTS 2729573 4/1978 Fed. Rep. of Germany ...... 126/446

Primary Examiner—Larry Jones
Attorney, Agent, or Firm—Larson and Taylor

[57] ABSTRACT

A solar collector adapted to heat a heat-carrying fluid is provided. The collector includes a heat absorbing wall formed by a plurality of panels which are integrally made of a conducting material. Adjacent panels slope with respect to each other in a saw tooth configuration to form alternating acute and obtuse dihedrons. The two adjacent panels defining an acute dihedron form therebetween an angle at least equal to the angle between the winter solstice and the summer solstice. In addition, the two panels are operably situated in planes directed respectively towards the respective solstice. An integrally formed gutter is also provided in the region of each apex with each gutter opening toward the inside of the acute dihedron. A plurality of heat conducting ducts which carry the heat-carrying fluid are shaped to by closely received in a respective gutter. Preferably, the angle between the two adjacent panels is between 65° and 70°. In addition, the gutters are preferably made from elastically deformable material so that the respective ducts may fit into the respective gutters by resiliently urging apart the respective edges of the gutters. The ducts and gutters preferably have a cylindrical cross section. The collector can also include an enclosure for the wall having a transparent front and a reflecting heat insulating back. If desired, a gas can be conveyed to this enclosure to heat the gas.

7 Claims, 2 Drawing Figures

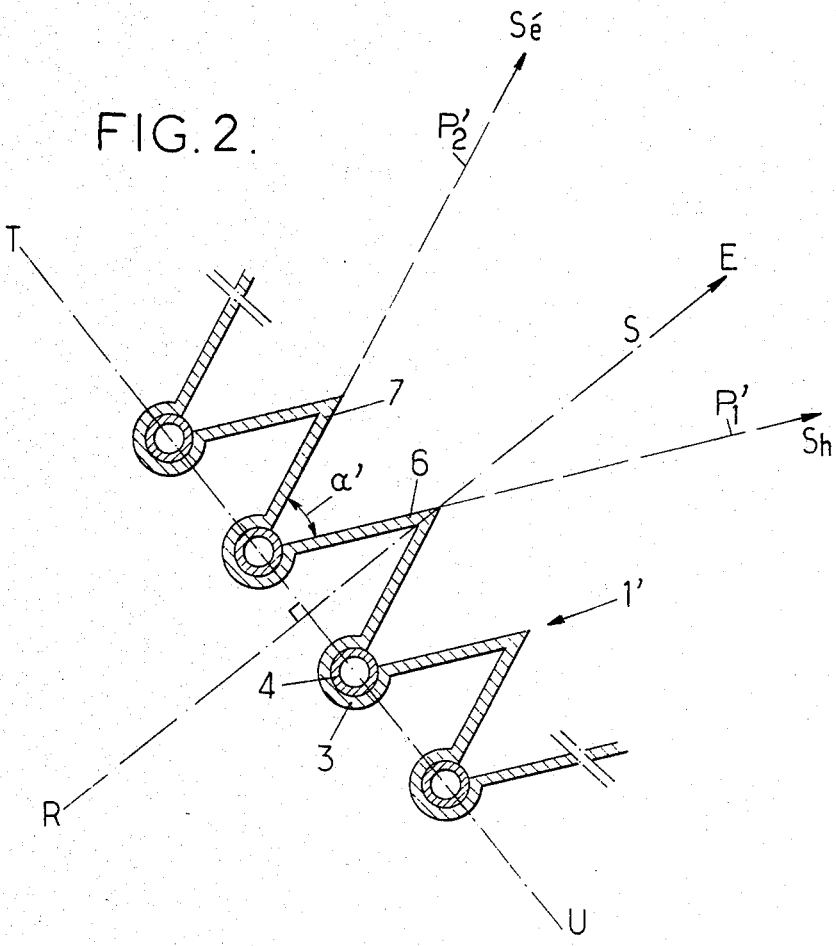

SOLAR COLLECTORS

The present invention relates to improvements to solar collectors, i.e. to apparatus adapted for collecting the heat energy contained in solar radiation and transferring it, at least in part, to a heat-carrying fluid. The aim of the invention is more particularly to improve solar collectors comprising, on the one hand, a heat absorbing wall formed by at least two panels made from a heat conducting material sloping with respect to each other so as to form a dihedron and, on the other hand, at least one duct for the heat-carrying fluid, formed from a heat-conducting material and extending to the bottom of the dihedron.

From the patent application FR 75 21 471 (published under the No. 2 316 553), a solar collector is already known comprising a heat absorber formed by a corrugated plate having a saw-tooth cross section, with ducts for the heat carrying fluid resting at the bottom of each hollow of the plate.

However, this document furnishes no practical embodiment of this general arrangement which, if applied as explained and shown in the document in question, could provide no interesting result because of the very poor heat conduction between the heat absorber and the heat carrying fluid ducts.

Furthermore, this known solar collector is intended in the position of use to be disposed horizontally, the plate of the heat absorber being turned towards the sky. No solution is proposed for recovering the solar radiation with a maximum of efficiency whatever the time of the year when the collector is used.

The invention has therefore essentially as its aim to remedy, as much as possible, the above outlined disadvantages and to provide a solar collector adapted so that a maximum of the heat accumulated in the absorber is transmitted to the heat-carrying fluid, and this whatever the time of the year, and so that the thus improved collector is of simple structure, easy to manufacture, to mount and to maintain and of a low overall cost.

To these ends, the solar collector in accordance with the invention is characterized by the combination of the following arrangements:

the two panels are joined together in the region of the apex of the dihedron, by a gutter opening inwards of the dihedron, made from a heat conducting material and taking on closely the outer form of the heat-carrying fluid duct which is housed thereinside and with which it is in heat-conducting contact, and the two panels form therebetween an angle at least equal to the angle between the winter solstice and the summer solstice at the location where the collector is installed, the two panels being, in the operating position of the collector, situated in planes directed approximately respectively towards said solstices.

Preferably, the angle formed by the two panels is substantially greater than the angle between the winter and summer solstices and is between 65° and 70° (FIG. 1).

In a preferred embodiment, the two panels and the connecting gutter form a single piece.

To simplify the procedure for assembling the collector, the panels and the gutter are formed from an elastically deformable material so that the duct may be fitted into the gutter by resiliently urging the edges of this latter apart.

A preferred arrangement of the collector of the invention consists in the absorbing wall comprising a plurality of pairs of panels forming a plurality of dihedrons, in all the dihedrons being in heat conducting contact with each other and in all the panels being disposed one after the other in a saw-tooth configuration.

Advantageously, the collector further comprises a closed enclosure adapted to support the heat-absorbing wall, the wall—front wall—of the enclosure the closest to the dihedrons projecting from the heat-absorbing wall being made from a transparent material and the opposite wall—rear wall—being formed from a heat insulating material and, preferably, the inner surface of the rear wall is reflecting.

In a particular embodiment, the heat-absorbing wall and the rear wall of the enclosure define a space through which a gas to be heated may flow and a fresh air intake orifice is provided at the low part of the space and a heated air outlet orifice at the top part of the space. The collector thus formed is able to ensure, cumulatively or selectively, a double function, namely heating the heat-carrying fluid (water for example) flowing in the ducts and heating a gas (air for example) flowing in the enclosure in contact with the absorber.

The invention will be better understood from reading the detailed description which follows of some embodiments given solely by way of illustrative examples, without any limiting character. In this description, reference is made to the accompanying drawings in which:

FIG. 1 is a schematical cross sectional view of a solar collector constructed in accordance with the invention; and FIG. 2 is a schematical cross sectional view of a variant of an element of the collector of FIG. 1.

The solar collector shown in FIG. 1 comprises a closed enclosure 23, having for example a rectangular parallelepipedic form for reasons of convenience of manufacture, positioning and storage, but able to have any other simple or complex form which may be desired. This enclosure 23 is defined by two main walls, one (front wall 9) being transparent and for example made from glass and the other (rear wall 17) being made from a heat insulating panel made from an appropriate heat insulating material (for example polystyrene). The face turned towards the inside of the panel 17 is coated with a film or foil 10 reflecting the electromagnetic waves (in particular the infra reds). This film is made from a polished metal (aluminium, stainless steel, etc.).

The other walls (two top and bottom lateral walls) may, for example, be formed by a strip 18 (or strip sections joined together) maintaining the two walls 9 and 17 spaced apart from each other. To avoid heat losses, the connections between walls 9 and 17 and strip 18 are fluid-tight.

Inside enclosure 23, a heat absorbing wall or absorber 1, supported by strip 18, extends between the two walls 9 and 17 without however touching them. Absorber 1 is made from a good heat conducting material and has a succession of panels 6,7 presenting respectively different slopes, all the panels of the same slope being parallel to each other.

Two consecutive panels 6,7 define a re-entrant dihedron with angle α and are joined together, in the region of the apex of the dihedron, by a gutter 3 open towards the inside of the dihedron, it too being made from a heat conducting material and taking on closely the external shape of a duct 4 for conveying a heat-carrying fluid (for example water). Since duct 4 will in general be a tube section cylindrical in revolution, gutter 3 has, in cross section, the shape of an arc of a circle.

It will be understood that this structure lends itself well to easy manufacture, to the extent that the absorber 1 may be obtained by appropriate deformation, for example by stamping or die-stamping, of a relatively thick sheet of a good heat conducting material such as aluminium; gutter 3 may then have a diameter slightly less than the outer diameter of ducts 4. The sections of ducts 4 are then simply force fitted into the gutters 3, which elastically enclose the respective duct sections thus providing good thermal contact between absorber 1 and duct 4. If required, an intermediary, such as silicon grease, may be interposed between the cooperating faces of the gutters and of the ducts to improve the heat conduction.

The front face (namely the exposed face turned towards the front wall 9) of panels 6,7 may have received a selective treatment by painting or by a chemical process.

The above mentioned angle $\alpha$ is at least equal to the angle $\beta$ between the winter solstice (arrow $S_h$) and the summer solstice (arrow $S_é$) at the place where the collector is installed. In other words, planes $P_1$ and $P_2$ in which the panels are respectively located, form an angle $\alpha$ which, for French regions where angle $\beta$ is of the order of 47° may be between 65° and 70°, so that, even in extreme situations, the solar rays strike the front faces of panels 6 and 7.

If we assume that enclosure 23 is intended to rest in the position shown in FIG. 1, the result is that panels 6 form an angle $\gamma$ of about 5° to 10° with respect to a horizontal plane (i.e. with respect to a plane perpendicular to the principal walls 9 and 17) whereas panels 7 form an angle $\delta$ of about 60° to 65° with respect to the same horizontal plane.

It may be arranged for absorber 1 to be sealingly connected to strip 18 over the whole of its periphery. The result is an enclosed space 13 between absorber 1 and the reflecting face 10. An air intake orifice 15 is provided at the base of the enclosure for the intake of fresh air into space and an air outlet orifice 16 is provided at the top part of the enclosure for discharging from space 13 the air which has been heated in contact with the rear face 12 of absorber 1. The slope $\gamma$ given to panels 6 ensures the natural rising flow of the heat air. Closure devices 19,20 may be provided for closing off respectively the orifices 15,16 when the flow of air is to be interrupted in space 13.

The solar collector which has just been described may then, cumulatively or selectively, heat a heat-carrying fluid (water) flowing in ducts 4 and a gas (air) flowing through space 13.

FIG. 2 shows a variant of absorber 1. The structure of absorber 1' of FIG. 2 is identical to that of absorber 1, namely a succession of panels 6,7 with different slope forming dihedrons and being joined to one another, into re-entrant dihedrons, by respective gutters 3, open towards the inside of the dihedrons and elastically enclosing duct 4 through which flows a heat carrying fluid.

The difference existing with respect to the preceding embodiment resides in the fact that the absorber is designed to be used in a sloping position so that the axis (TU) of alignment of the centers of the gutters are orthogonal to the axis (RS) joining the place of use to the sun's equinox (arrow E). Panels 6 and 7 are then situated symmetrically with respect to the axis (RS) or to axes parallel thereto; in other words, planes $P'_1$ and $P'_2$ containing panels 6 and 7 form the same angle with respect to the axis (RS) and the angle $\alpha'$ formed by these panels may be chosen approximately equal to the angle between the winter and summer solstices (arrows $S_h$ and $S_é$), namely approximately 47°.

As is evident and as it follows moreover already from what has gone before, the invention is in no wise limited to those of its embodiments and modes of application which have been more especially considered; it embraces, on the contrary, all variations thereof.

The solar collector constructed in accordance with the invention may be disposed on the facades of buildings, resting on barriers, balustrades of terraces, balconies, against a wall or a fence, on the band available under the gutters of houses, or totally integrated in the facades of buildings adapted to be heated by solar energy. The solar collector of the invention may be easily integrated into light individual dwellings using hot air heating.

Particularly interesting applications may be the drying of cereals, of forage, temperature raising and regulation of the hygrometry in green-houses, heating of water and air in swimming pools, heating of sanitary water etc.

I claim:

1. A solar collector adapted to heat a heat-carrying fluid comprising:
    a heat absorbing wall formed by: (a) a plurality of panels which are integrally made of a heat conducting material with adjacent panels sloping with respect to each other in a saw-tooth configuration so as to form alternating acute and obtuse dihedrons with respect to incident solar radiation, said two adjacent panels defining an acute dihedron forming therebetween an angle at least equal to the angle between the winter solstice and the summer solstice at the place where the collector is designed to be installed and being operatively situated in planes directed respectively toward the respective solstices; and (b) an integrally formed gutter in the region of the apex of each acute dihedron, each said gutter opening toward the inside of the dihedron; and
    a plurality of heat conducting ducts formed of a heat conducting material in which the heat-carrying fluid flows, each said duct having a shape adapted to be closely received in a respective said gutter in heat conducting contact therewith.

2. The collector according to claim 1, characterized in that the angle formed by the two panels is substantially greater than the angle between the winter and summer solstices and is between 65° and 70°.

3. The collector according to claim 1, characterized in that the panels and the gutters are made from an elastically deformable material so that the respective ducts may fit into the respective gutters while resiliently urging apart the respective edges thereof.

4. The collector according to claim 1, characterized in that the ducts have a section cylindrical in revolution.

5. The collector according to claim 1, further comprising a closed enclosure adapted to support the heat absorbing wall having a front wall adjacent to the obtuse dihedrons being made from a transparent material and a rear wall being made from a heat insulating material.

6. The collector according to claim 5, characterized in that the inner surface of the rear wall is reflecting.

7. The collector according to claim 5, characterized in that the heat absorbing wall and the rear wall of the enclosure define a space through which may flow a gas to be heated and in that there are provided a fresh air intake orifice situated at the low part of the space and a heated air outlet orifice situated at the top part of the space.

* * * * *